(12) United States Patent
Raveendran Nair et al.

(10) Patent No.: US 12,478,925 B2
(45) Date of Patent: Nov. 25, 2025

(54) OIL/WATER SEPARATION

(71) Applicant: The University of Manchester, Manchester (GB)

(72) Inventors: Rahul Raveendran Nair, Manchester (GB); Kun Huang, Manchester (GB)

(73) Assignee: The University of Manchester, Manchester (GB)

( * ) Notice: Subject to any disclaimer, the term of this patent is extended or adjusted under 35 U.S.C. 154(b) by 916 days.

(21) Appl. No.: 17/424,450

(22) PCT Filed: Jan. 20, 2020

(86) PCT No.: PCT/GB2020/050106
§ 371 (c)(1),
(2) Date: Jul. 20, 2021

(87) PCT Pub. No.: WO2020/152441
PCT Pub. Date: Jul. 30, 2020

(65) Prior Publication Data
US 2022/0080360 A1    Mar. 17, 2022

(30) Foreign Application Priority Data

Jan. 21, 2019 (GB) .................................. 1900812

(51) Int. Cl.
| | |
|---|---|
| *B01D 69/12* | (2006.01) |
| *B01D 67/00* | (2006.01) |
| *B01D 69/02* | (2006.01) |
| *B01D 69/10* | (2006.01) |
| *B01D 71/02* | (2006.01) |
| *B01D 71/56* | (2006.01) |
| *C02F 1/44* | (2023.01) |
| *C02F 101/32* | (2006.01) |

(52) U.S. Cl.
CPC ......... *B01D 69/12* (2013.01); *B01D 67/0088* (2013.01); *B01D 69/02* (2013.01); *B01D 69/10* (2013.01); *B01D 69/1213* (2022.08); *B01D 71/024* (2013.01); *B01D 71/56* (2013.01); *C02F 1/44* (2013.01); *B01D 2323/04* (2013.01); *B01D 2323/36* (2013.01); *B01D 2325/04* (2013.01); *B01D 2325/16* (2013.01); *B01D 2325/38* (2013.01); *C02F 2101/32* (2013.01)

(58) Field of Classification Search
CPC ............ B01D 2323/04; B01D 2323/36; B01D 2325/04; B01D 2325/16; B01D 2325/38; B01D 67/00416; B01D 67/0079; B01D 67/0088; B01D 69/02; B01D 69/10; B01D 69/12; B01D 69/1213; B01D 69/125; B01D 69/1411; B01D 69/148; B01D 71/024; B01D 71/56; B01D 61/00; B01D 63/00; C02F 1/44; C02F 1/4693; C02F 2101/32; C02F 3/1268
See application file for complete search history.

(56) References Cited

U.S. PATENT DOCUMENTS

| | | | | |
|---|---|---|---|---|
| 3,791,969 A | * | 2/1974 | Patil et al. ............. | B01D 71/02 264/307 |
| 5,271,851 A | * | 12/1993 | Nelson et al. ......... | B01D 37/02 210/328 |
| 2013/0001153 A1 | * | 1/2013 | Na .......................... | C08L 83/10 210/488 |

OTHER PUBLICATIONS

Ji Won Suk et al: "Evaluation of elastic modulus of ultra-thin vermiculite membranes by contact mode atomic force microscopy imaging", Thin Solid Films, vol. 527, Dec. 22, 2012 (Dec. 22, 2012), pp. 205-209, XP055672815, Amsterdam, NL ISSN: 0040-6090, DOI: 10.1016/j.tsf.2012.12.024 (Year: 2012).*

(Continued)

*Primary Examiner* — Krishnan S Menon
*Assistant Examiner* — Tak L Chiu
(74) *Attorney, Agent, or Firm* — Seed Intellectual Property Law Group LLP

(57) ABSTRACT

This invention relates to a method of separating oils and aqueous media. The method uses membranes comprising 2D phyllosilicate coatings. The invention also relates to membranes for use in said methods.

15 Claims, 20 Drawing Sheets

(56) References Cited

OTHER PUBLICATIONS

Ji Won Suk, Richard D. Piner, Jinho An, Rodney S. Ruoff, Evaluation of elastic modulus of ultra-thin vermiculite membranes by contact mode atomic force microscopy imaging, Thin Solid Films, vol. 527, pp. 205-209, ISSN 0040-6090 (Year: 2013).*

Ultrafast Separation of Emulsified Oil/Water Mixtures by Ultrathin Free-Standing Single-Walled Carbon Nanotube Network Films (Year: 203).*

Evaluation of elastic modulus of ultra-thin vermiculite membranes by contact mode atomic force microscopy imaging (Year: 2012).*

Office Action, dated Oct. 5, 2022, of European Application No. 20701858.1. (10 pages).

Shi et al., "Ultrafast Separation of Emulsified Oil/Water Mixtures by Ultrathin Free-Standing Single-Walled Carbon Nanotube Network Films," *Adv. Mater.* 25:2422-2427, 2013. (6 pages).

Gogoi e al., "Intercalating cation specific self-repairing of vermiculite nanofluidic membrane," *J. Mater. Chem. A* 6:21990, 2018, 9 pages.

Suk et al., "Evaluation of elastic modulus of ultra-thin vermiculite membranes by contact mode atomic force microscopy imaging," Thin Solid Films, http://dx.doi.org/10.1016/j.tsf.2012.12.024, 2013, 5 pages.

Graphene Enabled Systems Ltd. Flyer, "Filtration: Removal of Contaminants Using 2D Materials Membranes," 1 page (no date provided).

Shao et al., "Self-assembled two-dimensional nanofluidic proton channels with high thermal stability," *Nature Communications* 6:7602, DOI:10.1038/ncomms8602/www.nature.com/naturecommunications, 2015, 8 pages.

* cited by examiner

OIL/WATER SEPARATION

This invention relates to a method of separating oils and aqueous media. The method uses membranes comprising 2D phyllosilicate coatings. The invention also relates to membranes for use in said methods.

BACKGROUND

The separation of oily liquids from water and other aqueous media finds application in many fields of technology. Examples include oil extraction, oil spillage clear up, cleaning up used ('grey') water for re-use, e.g. in domestic washing machines.

Graphene oxide flakes have been coated onto filtration membranes to provide those membranes with the ability to separate oils from water (Huang, Y., et al., *Ultrafiltration Membranes with Structure-Optimized Graphene-Oxide Coatings for Antifouling Oil/Water Separation*. Advanced Materials Interfaces, 2015. 2(2): p. 1400433). The resultant membranes, however were prone to fouling and the number of times they could be reused was limited.

Shao et al ('Self assembled two-dimensional nanofluidic proton channels with high thermal stability'; *Nat. Commun.* 6:7602 doi10.1038/ncomms8602 (2015)) have shown that laminate films formed from exfoliated vermiculite can conduct protons. The 2D vermiculite flakes were associated with lithium ions and the laminate films were micrometers thick.

BRIEF SUMMARY OF THE DISCLOSURE

In a first aspect of the present invention there is provided a method of separating an oil and an aqueous medium from a mixture of the oil and the aqueous medium, the method comprising:
  A) contacting a first face of a composite membrane with the mixture of the oil and the aqueous medium to provide the separated aqueous medium at a second face of the membrane and the separated oil at a first face of the membrane; and
  B) recovering the aqueous medium from or downstream from the second face of the composite membrane and/or recovering the oil from or downstream from the first face of the composite membrane;
wherein the composite membrane comprises a porous support membrane, the first face of which is coated with a hydrated coating, said coating comprising a plurality of 2D phyllosilicate flakes and a plurality of cations associated with said 2D phyllosilicate flakes, wherein the coating is no more than 1 μm thick.

In a second aspect of the invention is provided a composite membrane, said composite membrane comprising a porous support membrane, said porous support membrane having a first face that is coated with a coating, said coating comprising a plurality of 2D phyllosilicate flakes and a plurality of cations associated with said 2D phyllosilicate flakes, wherein the coating is no more than 1 μm thick. In use, said coating will typically be hydrated. However, it could be that the composite membrane is supplied in a dry state and that the coating is hydrated before use.

In a third aspect of the invention is provided a separation device comprising a composite membrane of the second aspect of the invention.

In a fourth aspect of the present invention there is provided a use of a composite membrane to separate an oil and an aqueous medium from a mixture of the oil and the aqueous medium; wherein the composite membrane comprises a porous support membrane, the first face of which is coated with a hydrated coating, said coating comprising a plurality of 2D phyllosilicate flakes and a plurality of cations associated with said 2D phyllosilicate flakes, wherein the coating is no more than 1 μm thick.

The inventors have found that by coating a porous support membrane with a thin layer of 2D phyllosilicate flakes having associated cations, they generate a membrane that can separate oil and water. The aqueous medium passes through the membrane. The oil does not pass through. The membranes are resistant to fouling and can be reused many times, in contrast to similar membranes formed with a graphene oxide coating instead of 2D phyllosilicate. The membrane is hydrophilic and, in certain embodiments, superhydrophilic. The membrane is oleophobic when water is present. The combination of the hydrophilicity and oleophobicity gives rise to the remarkable anti-fouling properties of the membranes of the invention. This is a particularly surprising effect as bulk phyllosilicates, for example vermiculite, are used to absorb oils, the opposite effect to that observed with the membranes of the present invention.

In a fifth aspect of the invention is provided a method of making a composite membrane of the second aspect, said method comprising the step:
  A) coating a first face of a porous support membrane with a coating comprising a plurality of 2D phyllosilicate flakes and a plurality of cations associated with said 2D phyllosilicate flakes, wherein the coating is no more than 1 μm thick.

Membranes

It may be that the 2D phyllosilicate flakes and the associated cations are selected such that if the flakes and associated cations are formed into a hydrated 5 μm thick laminate membrane, the surface of that membrane would have a water contact angle that is less than 40°. It may be that the 2D phyllosilicate flakes and the associated cations are selected such that if the flakes and associated cations are formed into a hydrated 5 μm thick laminate membrane, the surface of that membrane would have a water contact angle that is less than 30°. It may be that the 2D phyllosilicate flakes and the associated cations are selected such that if the flakes and associated cations are formed into a hydrated 5 μm thick laminate membrane, the surface of that membrane would have a water contact angle that is less than 15°. 2D vermiculite flakes that are associated with lithium ions form hydrated laminate membranes that have a water contact angle of 0° C. Hydrated membranes and coatings formed of 2D vermiculite flakes that are associated with lithium ions are superhydrophillic (meaning that the water contact angle that is less than 15°)

It may be that the plurality of cations comprises ions having a single positive charge. It may be that the plurality of cations are all ions having a single positive charge.

It may be that the plurality of cations comprises metal ions (e.g. metal ions having a single positive charge). It may be that the plurality of cations are all metal ions (e.g. metal ions having a single positive charge).

It may be that the plurality of cations comprises organic ions (e.g. organic ions having a single positive charge). It may be that the plurality of cations are all organic ions (e.g. organic ions) having a single positive charge. Organic ions include those having a nitrogen atom that is directly attached to four other atoms, e.g. four carbon or hydrogen atoms. Organic ions include tetraalkyl ammonium ions and N-alkylated nitrogen heteroaryl groups (e.g. pyridines, imidazoles, pyrazoles, indoles, pyridazine, pyrazines, pyrimidines).

It may be that the plurality of cations comprises alkali metal ions. It may be that the plurality of cations are all alkali metal ions.

Potassium has a particularly strong association with phyllosilicates. It may be that the plurality of cations comprises potassium and a plurality of at least one other cation.

It may be that the plurality of cations comprises lithium ions. It may be that the plurality of cations are all lithium ions. It may be that the plurality of cations are a mixture of lithium ions and at least one other metal ion (e.g. at least one other alkali metal ion or at least one other metal ion having a single positive charge). It may be that the plurality of cations are a mixture of lithium ions and potassium ions.

It may be that the flakes and the cations associated with them together have no charge. It may be that the flakes and the cations associated with them together have a negative charge. 2D phyllosilicate flakes are typically negatively charged. The cations that are associated with the flakes reduce the negative charge and, if enough cations are present, can completely neutralise the negative charge. If fewer cations are present, however, the flakes and the cations associated with them will together have a negative charge. Where the cation is lithium, for example, it does not typically associate in sufficient amounts with the flakes in order to neutralise the flake and the flakes together with the lithium ions have a negative charge. The net charges of the flakes and cations associated with them can be measured by measuring the zeta potential. It may be that the flakes and the cations associated with them together have a zeta potential that is more negative than −0.02. It may be that the flakes and the cations associated with them together have a zeta potential that is more negative than −0.04.

The 2D phyllosilicate flakes may be 2D vermiculite flakes. The coating may comprise a mixture of 2D flakes of two or more different 2D phyllosilicates, e.g. a mixture of 2D vermiculite flakes and 2D flakes of at least one other phyllosilicate.

It may be that the coating comprises a plurality of 2D phyllosilicate flakes having a size distribution such that greater than 50 wt % (e.g. greater than 85% or greater than 95%) of the flakes have a flake size that is less than 20 μm. It may be that the coating comprises a plurality of 2D phyllosilicate flakes having a size distribution such that greater than 50 wt % (e.g. greater than 85% or greater than 95%) of the flakes have a flake size that is less than 10 μm. It may be that the coating comprises a plurality of 2D phyllosilicate flakes having a size distribution such that greater than 50 wt % (e.g. greater than 85% or greater than 95%) of the flakes have flake size that is less than 2 μm.

It may be that the coating comprises a plurality of 2D phyllosilicate flakes having a size distribution such that greater than 50 wt % (e.g. greater than 85% or greater than 95%) of the flakes have a flake size that is greater than 100 nm. It may be that the coating comprises a plurality of 2D phyllosilicate flakes having a size distribution such that greater than 50 wt % (e.g. greater than 85% or greater than 95%) of the flakes have a flake size that is greater than 200 nm. It may be that the coating comprises a plurality of 2D phyllosilicate flakes having a size distribution such that greater than 50 wt % (e.g. greater than 85% or greater than 95%) of the flakes have a flake size that is greater than 500 nm.

It may be that greater than 50% by weight (e.g. greater than 85% or greater than 95%) of the 2D phyllosilicate has a thickness of from 1 to 5 phyllosilicate layers. It may be that greater than 50% by weight (e.g. greater than 85% or greater than 95%) of the 2D phyllosilicate has a thickness of from 1 to 3 phyllosilicate layers. It may be that greater than 50% by weight (e.g. greater than 85% or greater than 95%) of the 2D phyllosilicate has a thickness of a single phyllosilicate layer.

It may be that the coating is no more than 500 nm thick. It may be that the coating is no more than 100 nm thick. It may be that the coating is no more than 60 nm thick. For certain porous support membranes, 60 nm is the thickness above which the coating forms a laminate structure. Where the coating forms a laminate structure the water flux is typically lowered. The thickness at which the coating becomes a laminate varies depending on the material, surface roughness and pore size of the porous support membrane. It may be that the coating is no more than 40 nm thick. It may be that the coating is no less than 10 nm thick. The inventors have found that membranes having a coating thickness below 10 nm are still effective at separating oil and water but are less resistant to fouling than membranes having a coating that is thicker than 10 nm.

It may be that the coating thickness is such that the water flux through the composite membrane is reduced by no more than 50% relative to the water flux through the uncoated porous support membrane. It may be that the coating thickness is such that the water flux through the composite membrane is reduced by no more than 75% relative to the water flux through the uncoated porous support membrane.

The porous support membrane may have an average pore size that is no more than 20 μm. The porous support membrane may have an average pore size that is no more than 5 μm. The porous support membrane may have an average pore size that is no more than 2 μm. The porous support membrane may have an average pore size that is no less than 100 nm. The porous support membrane may have an average pore size that is no less than 300 nm. The porous support membrane may have an average pore size that is no more than 500 nm.

The porous support membrane may be a polymeric membrane. The porous support membrane may comprise a polymer selected from: polytetrafluoroethylene (PTFE), polyvinylidenedifluoride (PVDF), Poly(ether sulfone) (PES) and Polyamide (e.g. Nylon). The porous membrane may comprise nylon.

The porous support membrane may be inorganic, e.g. it may comprise alumina.

The porous support membrane may comprise a woven fabric, e.g. cotton.

The porous support membrane may comprise a metal mesh, e.g. steel.

The porous support membrane may, when uncoated, have a water contact angle that is less than 90°. The porous support membrane may, when uncoated, have a water contact angle that is less than 60°. The porous support membrane may, when uncoated, have a water contact angle that is less than 40°.

There may be an adhesion promoter between the coating and the porous support membrane. The adhesion promoter may be a positively charged polymer coating, e.g a coating of Polydiallyldimethylammonium chloride (PDADMAC).

The surface of the support membrane may have been treated to increase adhesion between the support membrane and the coating, e.g. plasma treatment or chrono treatment.

The porous support membrane make take the form of a hollow porous tube or fiber.

The coating may further comprise a binder, e.g. Poly vinyl acetate.

It may be that the plurality of 2D phyllosilicate flakes and the plurality of cations associated with said 2D flakes together make up no less than 65% by weight of the coating. It may be that the plurality of 2D phyllosilicate flakes and the plurality of cations associated with said 2D flakes together make up no less than 85% by weight of the coating.

The composite membrane may take the form of a flat sheet or series of flat sheets. The composite membrane may take the form of a hollow fibre.

It may be that the second face of the porous support membrane is coated with the same coating as the first face. This can facilitate manufacture and/or be of use in multidirectional separation systems.

Methods of Separating Oil/Aqueous Medium Mixtures Using Said Membranes and Uses of Said Membranes in Separating Oil/Aqueous Mixtures The following fall backs are expressed as applying to a method of the invention but they apply equally to both the first or fourth aspects of the invention.

The mixture of the oil and the aqueous medium may be an emulsion. The inventors have found that the methods of the invention are suitable for separating the oil and water components of an emulsion. Emulsions are traditionally harder to separate by filtration than non-emulsion mixture of oils and water.

The method may be continuous. Thus, steps A) and B) may be carried out simultaneously or substantially simultaneously.

It may be that step B) comprises recovering the aqueous medium from or downstream from the second face of the composite membrane. It may be that step B) comprises recovering the oil from or downstream from the first face of the composite membrane. It may be that step B) comprises both recovering the aqueous medium from or downstream from the second face of the composite membrane and recovering the oil from or downstream from the first face of the composite membrane.

It may be that the mixture of the oil and the aqueous medium is agitated as it is contacted with the membrane.

Contacting the first face of a composite membrane with the mixture of the oil and the aqueous medium will typically comprise causing the aqueous medium to pass through the composite membrane. It may be that the aqueous medium passes through the composite membrane by diffusion. In these embodiments, membranes with coatings that are no more than 20 nm thick are preferred. It may be that a force is applied to the mixture as it is in contact with the first face of the composite membrane, said force being directed such as to cause the aqueous medium to pass through the composite membrane. The force may be gravity. It may be that the force is pressure. In these embodiments, membranes with coatings that are no less than 20 nm thick are preferred. The pressure may be less than 5 bar. The pressure may be less than 3 bar. The pressure will typically be greater than 1 bar.

It may be that contacting a first face of the composite membrane with the mixture of the oil and the aqueous medium comprises causing the mixture of the oil and the aqueous medium to flow across the first face of the membrane. This is known as cross-flow. The term 'flow across the first face of the membrane' means that the mixture is caused to flow in a direction substantially parallel to the plane of the membrane while being in contact with that first face. The membranes of the invention have been shown to be particularly resistant to fouling when used for cross-flow separation. The mixture may be caused to flow at a velocity between 0.05 ms$^{-1}$ and 5.0 ms$^{-1}$. The mixture may be caused to flow at a velocity below 1.5 ms$^{-1}$. The mixture may be caused to flow at a velocity below 1.0 ms$^{-1}$. The mixture may be caused to flow at a velocity below 0.6 ms$^{-1}$. Often oil-water separation membranes use cross-flow techniques with high flow velocities because the higher velocities give rise to increased turbulence and decreased fouling. However, high velocities can reduce the longevity of the membranes. The membranes of the invention are so resistant to fouling that high flow velocities are not required.

The method may comprise the step of hydrating a dry composite membrane to produce the hydrated composite membrane used in step A). The step of hydrating the dry composite membrane may comprise soaking the dry composite membrane in water.

The method may involve contacting a plurality of said composite membranes with the mixture. Thus, the filtration device of the third aspect may comprise a plurality of said composite membranes. These may be arranged in parallel (to increase the flux capacity of the process/device) or in series (where the separation of oil and aqueous medium achieved by a single laminate membrane is less than desired).

The separation may be complete or it may be partial. The proportion of the separated aqueous medium that is oil may be reduced by 25% or more relative to the starting mixture. The proportion of the separated aqueous medium that is oil may be reduced by 50% or more relative to the starting mixture. The proportion of the separated aqueous medium that is oil may be reduced by 75% or more relative to the starting mixture. The proportion of the separated aqueous medium that is oil may be reduced by 90% or more relative to the starting mixture. The proportion of the separated oil that is aqueous medium may be reduced by 25% or more relative to the starting mixture. The proportion of the separated oil that is aqueous medium may be reduced by 50% or more relative to the starting mixture. The proportion of the separated oil that is aqueous medium may be reduced by 75% or more relative to the starting mixture. The proportion of the separated oil that is aqueous medium may be reduced by 90% or more relative to the starting mixture.

The aqueous medium may be water. The aqueous medium may be an aqueous solution. The aqueous medium may be a solution of a salt, e.g. an alkali metal or alkali earth metal halide salt. The aqueous medium may be a solution comprising NaCl, e.g. sea water. The inventors have found that the antifouling properties of the membranes of the invention are maintained even when salts (e.g. salts comprising metal ions) are present in the aqueous medium.

The oil will typically be a liquid at room temperature and atmospheric pressure. If this is the case step A) and step B) will typically be carried out at a temperature in the range from 10° C. to 40°. It may be however that the oil is a solid at room temperature and atmospheric pressure. If this is the case step A) and step B) will typically be carried out at a temperature above the melting point of the solid. However, step A) and step B) will not typically be carried out at a temperature above 75° C.

Methods of Making the Composite Membrane

The method may further comprise exfoliating a bulk phyllosilicate suspended in an aqueous solution comprising the cations to provide a suspension of 2D phyllosilicate flakes that are associated with said cations. Where the cations are lithium ions, the solution may comprise lithium ions (e.g. lithium chloride). It may be that some bulk phyllosilicate remains in the suspension after the exfoliation. If this is the case, the bulk phyllosilicate can be removed by centrifugation to provide a suspension of 2D phyllosilicate flakes that are associated with said cations. It may be that the solid components of the suspension, i.e. the 2D phyllosilicate flakes and the bulk phyllosilicate, may be removed from the suspension, e.g. by filtration. The solid components may be washed, e.g. with water. Once removed from the suspension and/or washed, the solid components may then be re-suspended in water and then subjected to centrifugation.

The thus formed suspension can then be used to coat the porous membrane. This may be done by passing the suspension through the porous membrane for a predetermined period of time, said period of time being sufficient to achieve the desired thickness of coating.

The exfoliation step may be achieved by applying energy to the suspension. Said energy may be sonic energy. The sonic energy may be ultrasonic energy. It may be delivered in using a bath sonicator or a tip sonicator. Alternatively the energy may be a mechanical energy, e.g. shear force energy or grinding. Preferably, however, the energy is heat energy. Thus, the step of exfoliating may comprise heating the suspension of the bulk phyllosilicate in the aqueous solution of the cations, e.g. heating to reflux.

The suspension may be subjected to energy (e.g. heat) for a length of time from 15 min to 1 week, depending on the properties and proportions (flake size and thickness) desired. The particles may be subjected to energy (e.g. heat) for a length of time from 12 hours to 3 days.

Prior to being exfoliated in the aqueous solution comprising the cations, the bulk phyllosilicate may be heated in a saturated NaCl solution. The resulting solid may be isolated, e.g. by filtration, and optionally washed, e.g. with water, before being suspended in the aqueous solution comprising the cations.

The bulk phyllosilicate may be vermiculite, e.g. thermally expanded vermiculite.

A method of forming 2D vermiculite flakes associated with lithium ions is described in Shao et al ('Self assembled two-dimensional nanofluidic proton channels with high thermal stability'; *Nat. Commun.* 6:7602 doi10.1038/ncomms8602 (2015)), incorporated herein by reference.

The method may further comprise, before coating the membrane with the 2D phyllosilicate, treating the surface of the membrane to increase adhesion between the membrane and the coating. Said treatment may be plasma treatment or chrono treatment. Alternatively, said treatment may comprise coating the membrane with an adhesion promoter. The adhesion promoter may be a positively charged polymer coating, e.g a coating of Polydiallyldimethylammonium chloride (PDADMAC).

BRIEF DESCRIPTION OF THE DRAWINGS

Embodiments of the invention are further described hereinafter with reference to the accompanying drawings, in which.

DETAILED DESCRIPTION

Figure 1:
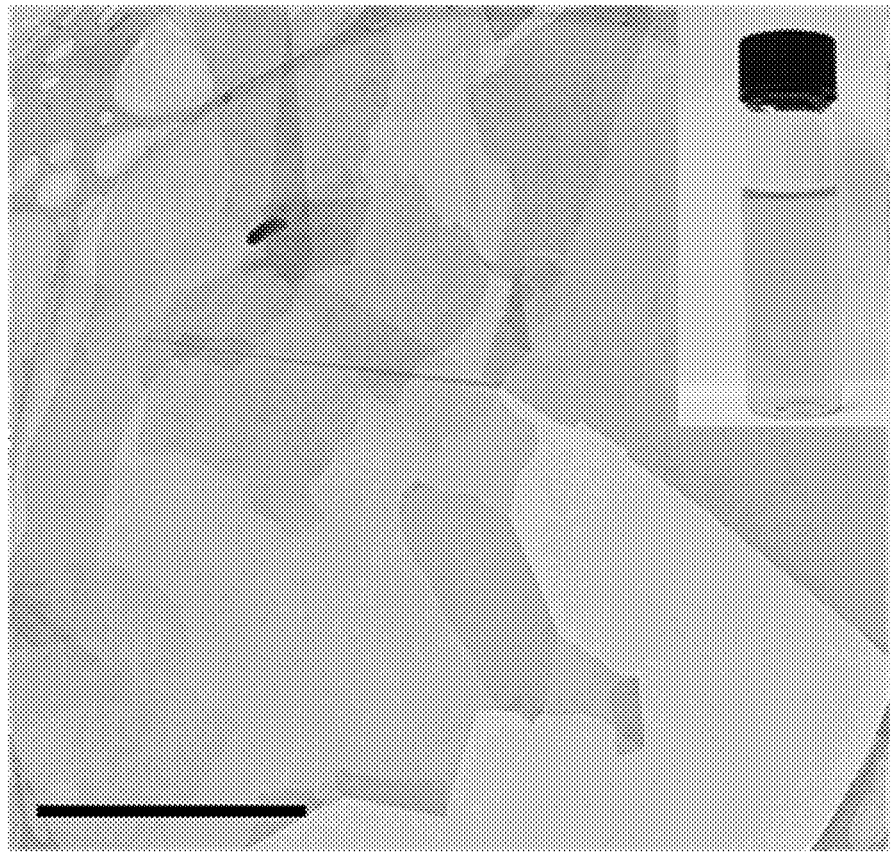
FIG. 1 shows a transmission electron microscope (TEM) image of exfoliated lithium vermiculite flakes. Scale bar, 10 µm.

Throughout this specification, the term 'oil' is used to describe any organic species that is poorly miscible or immiscible with water. Examples may include fuel oils, cooking oils, greases and fats, solvents and essential oils. The oil will typically be a liquid at room temperature but it may be a solid at room temperature, in which case the separation process of the first aspect may be conducted at a temperature that is higher than the melting point of the oil.

The term 'coating' is intended to mean that a layer of 2D phyllosilicate flakes lies on the support membrane. The coating may be on both sides of the substrate. It is possible, depending on the materials involved, the size of the pores and the size of the flakes, that the 2D phyllosilicate flakes coat the surfaces of the pores inside the support membrane, e.g. to a depth of up to 50 nm inside the support membrane. It may be however that substantially no (e.g. no more than 1% by weight) 2D phyllosilicate flakes are found inside the pores of the support membrane.

The term 'aqueous medium' refers to a mixture of substances which comprises at least 50% water by weight. It may comprise at least 75% water by weight, e.g. at least 90% water by weight. The term 'aqueous medium' preferably refers to either water or an aqueous solution. However, it is not intended to exclude the possibility that there might be particulate matter suspended in the aqueous medium. Of course, it is expected that any particulate matter that is larger than the pores of the composite membrane will not pass through the membrane.

Phyllosilicates are materials that comprise parallel sheets of silicate. The silicate within the sheets is typically in the form of a layer of interconnected tetrahedra and the ratio of silicon to oxygen in the sheets is typically 2:5. Exemplary phyllosilicates include Antigorite $(Mg_3Si_2O_5(OH)_4)$, Chrysotile $(Mg_3Si_2O_5(OH)_4)$, Lizardite $(Mg_3Si_2O_5(OH)_4)$, Halloysite $(Al_2Si_2O_5(OH)_4)$, Kaolinite $(Al_2Si_2O_5(OH)_4)$, Illite $((K,H_3O)(Al,Mg,Fe)_2(Si,Al)_4O_{10}[(OH)_2,(H_2O)])$, Montmorillonite $((Na,Ca)_{0.33}(Al,Mg)_2Si_4O_{10}(OH)_2 \cdot nH_2O)$, Vermiculite $((MgFe,Al)_3(Al,Si)_4O_{10}(OH)_2 \cdot 4H_2O)$, Talc $(Mg_3Si_4O_{10}(OH)_2)$, Sepiolite $(Mg_4Si_6O_{15}(OH)_2 \cdot 6H_2O)$, Attapulgite $((Mg,Al)_2Si_4O_{10}(OH) \cdot 4(H_2O))$, Pyrophyllite $(Al_2Si_4O_{10}(OH)_2)$, Biotite $(K(Mg,Fe)_3(AlSi_3)O_{10}(OH)_2)$, Fuchsite $(K(Al,Cr)_2(AlSi_3O_{10})(OH)_2)$, Muscovite $(KAl_2(AlSi_3)O_{10}(OH)_2)$, Phlogopite $(KMg_3(AlSi_3)O_{10}(OH)_2)$, Lepidolite $(K(Li,Al)_{2-3}(AlSi_3)O_{10}(OH)_2)$, Margarite $(CaAl_2(Al_2Si_2)O_{10}(OH)_2)$, Glauconite $((K,Na)(Al,Mg,Fe)_2(Si,Al)_4O_{10}(OH)_2)$ and Chlorite $((Mg,Fe)_3(Si,Al)_4O_{10}(OH)_2 \cdot (Mg,Fe)_3(OH)_6)$. Further information on phyllosilicates can be found in W. A. Deer, R. A. Howie, and J. Zussman. (2013). 3rd ed. *An Introduction to the Rock-forming Minerals*. London: Mineralogical Society. ISBN 9780903056274. 498 pp.

In certain embodiments, the phyllosilicate is a clay-type phyllosilicate (e.g. Halloysite, Kaolinite, Illite, Montmorillonite, Vermiculite, Talc, Sepiolite, Attapulgite, Pyrophyllite). In certain preferred embodiments, the phyllosilicate is vermiculite. In other embodiments, the phyllosilicate is a mica-type phyllosilicate (e.g. Biotite, Fuchsite, Muscovite, Phlogopite, Lepidolite, Margarite or Glauconite).

The term '2D phyllosilicate flake' refers to a flake of phyllosilicate that is from 1 to 5 phyllosilicate layers thick. The precise identity of a phyllosilicate layer varies depending on the identity of the bulk phyllosilicate from which the 2D material was obtained. A phyllosilicate layer is typically two sheets of silicate with a further mineral sheet (typically comprising aluminium, magnesium, iron and mixture thereof) sandwiched between them. The silicate sheets are typically comprised of interlinked tetrahedra and the further mineral sheet is typically comprised of interlinked octahedra, with the three layers being linked through oxygen atoms. In the bulk phyllosilicate material (indeed in 2D phyllosilicate flakes that are not a single phyllosilicate layer thick), the phyllosilicate layers are held together by interlayer hydrated cations. In vermiculite, for example, each phyllosilicate layer is comprised of one magnesium based octahedral sheet sandwiched between two tetrahedral silicate sheets. Substitutional $Al^{3+}$ impurities in the silicate sheets give the phyllosilicate sheets a net negative charge that is balanced by the cations situated between the phyllosilicate sheets. 2D vermiculite flakes therefore comprise from 1 to 5 phyllosilicate layers, with each phyllosilicate layer comprising two silicate tetrahedral sheets and a magnesium based octahedral sheet sandwiched between. A '2D phyllosilicate X flake' (where 'phyllosilicate X' is a particular phyllosilicate) may be considered to mean 'a flake that is from 1 to 5 phyllosilicate layers thick and formed by exfoliation of said phyllosilicate X'.

For the absence of doubt, the cations that are associated with the phyllosilicate flakes in the membranes of the invention are not necessarily the cations that are present in between the phyllosilicate layers in the bulk phyllosilicate. Ion exchange can occur during the exfoliation process, for example.

The membranes of the invention are formed from a plurality of 2D phyllosilicate flakes and a plurality of cations associated with said 2D phyllosilicate flakes. The term 'associated' is intended to mean that the cations are attached to the flake by ionic interactions. The cations may be situated within the phyllosilicate layers and/or the cations may be situated in between the phyllosilicate layers (where the flakes have more than 1 phyllosilicate layer) and/or the cations may be situated on the external surfaces of the 2D phyllosilicate flakes.

The term 'hydrated' means that the coating comprises water. The water will typically be associated with the cations, e.g. datively bonded to the cations.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLES

Stable aqueous dispersions of lithium vermiculite (LiV) (inset of FIG. 1) flakes were prepared from thermally expanded vermiculite crystals using a reflux ion exchange methodology. The transmission electron microscopy (TEM) (FIG. 1) and atomic force microscopy (AFM) image (FIGS. 2A & 2B) confirms that the individual flakes are defect free and have a thickness of ~1.5 nm. Micrometre-thick (5 µm) LiV-laminates were prepared from the above dispersion using vacuum filtration.

Compared to the bulk vermiculite crystals one of the unique features of the exfoliated vermiculite is its potential to use as a membrane or coating. Hence a thorough understanding of the wetting properties of such films is essential. We have used contact angle measurements, an experimentally accessible parameter, to characterize the surface wetting properties of LiV-laminates in both dry and wet states. We found that cation-exchange modifies the wetting properties of V-laminate in a tunable manner. The water contact angle in the air for dry LiV-laminate is 15°±1°, however, it is surprising to note that wet LiV-laminate is superhydrophilic with zero contact angle.

Figure 3:
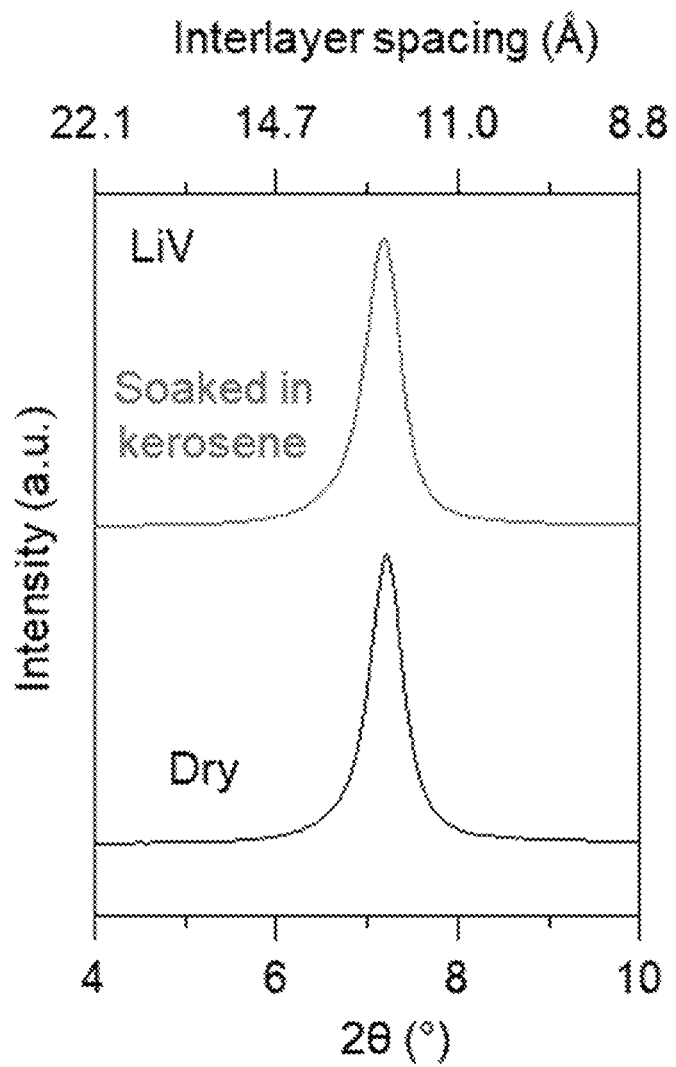
FIG. 3 shows X-ray diffraction (XRD) from a vacuum dried free-standing LiV-laminate and the same membrane soaked in kerosene for 48 h (colour coded labels).
Figure 4A:
FIG. 4A shows wetting properties of Li-vermiculite (LiV) laminates, including water contact angle of LiV laminate in dry and wet states. Scale bar, 750 µm.
Figure 4B:
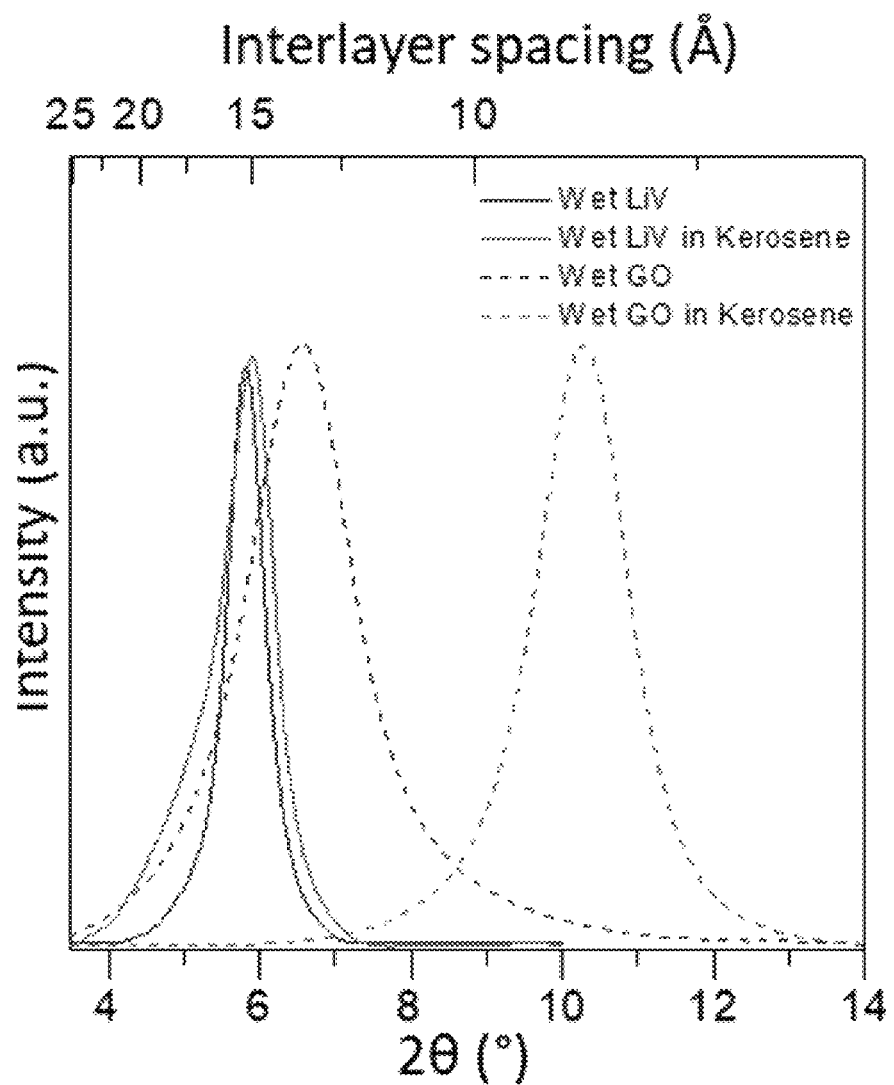
FIG. 4B shows an evaluation of water pinning property of free-standing wet LiV laminate measured by capturing XRD from wet LiV laminate before and after immersing in kerosene for a week. As a reference, a hydrophilic GO laminate was also tested in the same experimental conditions, it was found that water molecules were released from the membrane after 12 hours of kerosene exposure.

In general, superhydrophilic surfaces retain a hydration layer, and these layers function as a self-cleaning agent by repelling foulants such as biological molecules and oils. However, one of the main drawbacks of such surfaces is the instability of the hydration layer upon prolonged exposure to fouling environments. To investigate the hydration stability of LiV-laminates we have conducted XRD experiments on hydrated LiV-laminates exposed to oil. We found that there was no change in d-spacing even after a week of kerosene soaking. To rule out the possibility of intercalation of oil molecules into the interlayers and hence providing the same d-spacing, we exposed a dry LiV-laminate to kerosene, where we did not observe any intercalation (FIG. 3). As a control experiment, we have also conducted similar tests with hydrated graphene oxide (GO) membranes. As shown in FIGS. 4A and 4B, the d-spacing of wet GO membrane decreases from 13.5 Å to 8.5 Å, when exposed to kerosene for 12 h. This suggests that the interlayer water molecules in the GO membrane have diffused into the oil and the GO membrane has become dry in the oil environment. This in turn implies that the interlayer water in the GO membranes is relatively mobile whereas in the LiV-laminates it is firmly pinned to the interlayer gallery.

Figure 5A:
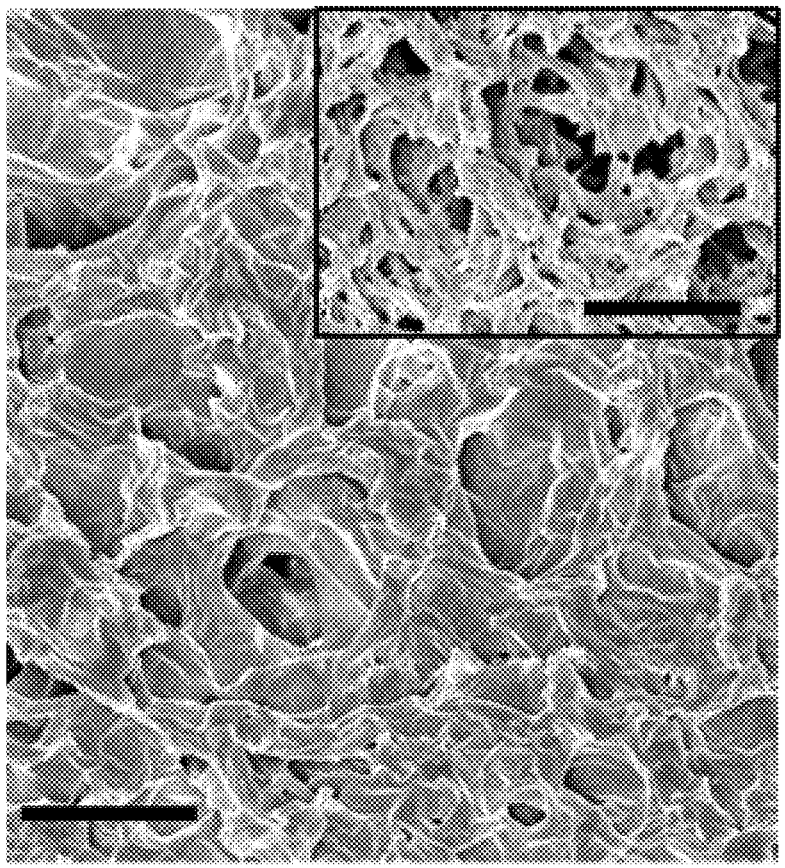
FIG. 5A is a SEM image showing the surface topography of a Li-vermiculite (LiV) coated (~30 nm) nylon membrane. Scale bar is 1 µm. Inset: SEM image of bare nylon membrane. Scale bar; 3 µm.

The exceptional water pinning features of LiV-laminate suggests its potential for designing antifouling oil-water separation membranes. To study the antifouling properties of LiV, we deposited a thin non-continuous layer of LiV on a hydrophilic ultrafiltration membrane (nylon) with pore size 1.1 µm (FIG. 5A) and performed oil-water filtration experiments. The pore size of such membranes was determined by capillary flow porometry (20). With increasing the LiV coating thickness, the pore size is observed to decrease and correspondingly the water flux through the membrane also decreases (FIG. 6). For further antifouling studies, we optimized the coating thickness to 30 nm (FIG. 6) such that the water flux through the coated membrane is comparable to the bare nylon membrane (>75%).

Figure 5B:
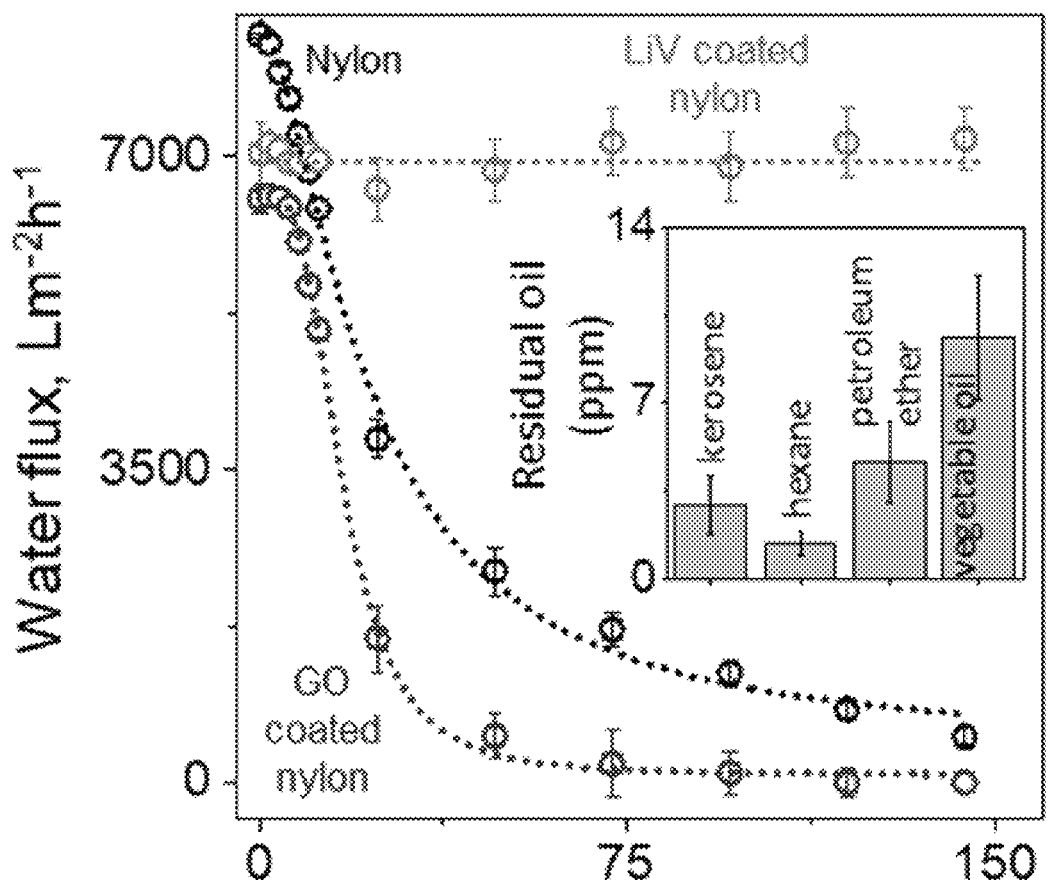
FIG. 5B shows the water flux through the LiV coated nylon, bare nylon, and a reference GO coated nylon membrane as a function of time during which membrane was in contact with kerosene. The measurement is performed at 1 bar differential pressure. Error bars denote standard deviations using three different measurements. Inset; residual organic carbon content in the permeate water of the LiV coated nylon membrane for different types of oil. Error bars denote standard deviation using measurement at different time intervals.

To test the antifouling properties of the membranes, we have then performed the oil-water separation experiments. Initially, all the membranes were pre-wetted with water to form the surface hydration layer to prevent the oil permeation. Such water wetted membranes only allow water to permeate but block oil below its breakthrough pressure at which water film breaks (~2 Bar for the membranes reported in FIGS. 5A-5D). Water flux through such membranes which were continuously in contact with a column of oil (50 ml) was periodically monitored. FIG. 5B shows the water flux at different time interval for LiV coated nylon membrane, reference nylon and GO coated nylon membrane. LiV coated membrane show a remarkably stable water flux of ~7000 $Lm^{-2}h^{-1}$ (at 1 bar) even after it is in continuous contact with oil for a week whereas bare nylon suffers severe fouling. Reference hydrophilic GO coating on nylon is found to be resistant to fouling for initial 6 hours (FIG. 5B), but thereafter fouling happens even more severely than bare nylon. We have also studied the oil repellent property of the LiV coated membrane by measuring the residual organic carbon content in the permeate water and found remarkably high oil repellency (few ppm carbon content as shown in FIG. 5B inset).

Figure 5C:
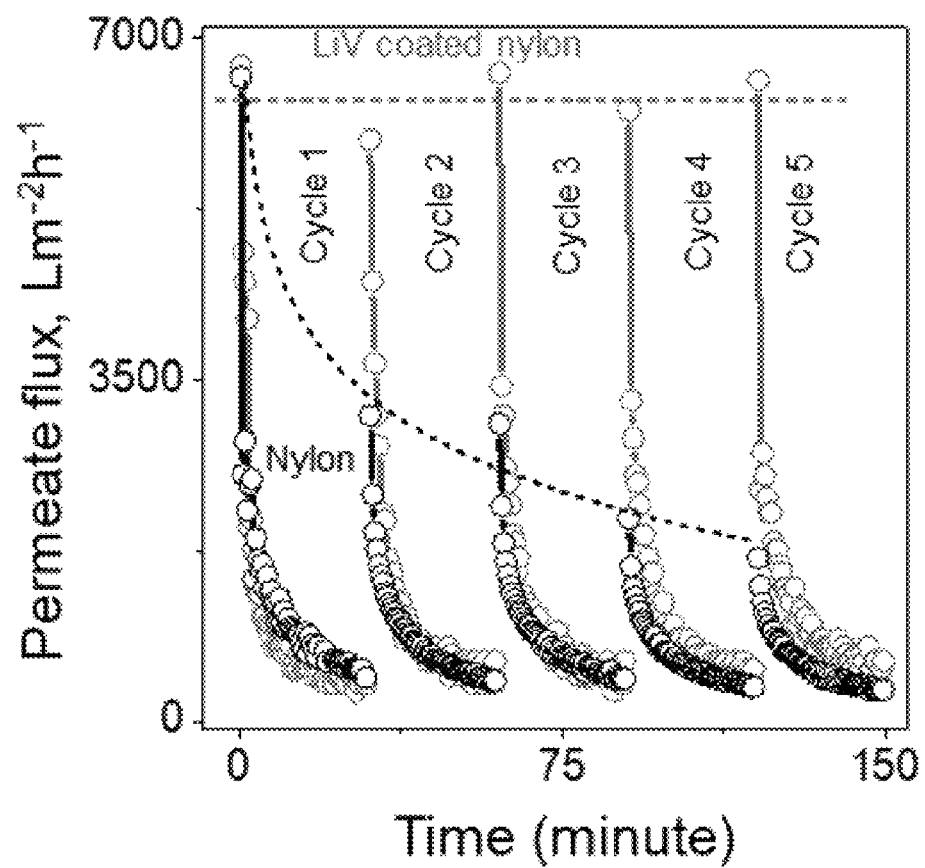
FIG. 5C shows permeate flux as a function of time during the multiple cycle emulsion separation by dead-end filtration at a pressure of 1 bar. The dotted lines are guide to eye for the initial permeate flux at each filtration cycle. The decrease in the permeate flux with time in each cycle could be due to the oil droplet deposition on the surface of the membrane. These droplets were easily removed by water soaking after each cycle in the case of LiV coated membrane whereas it fouls the bare nylon membrane permanently.
Figure 5D:
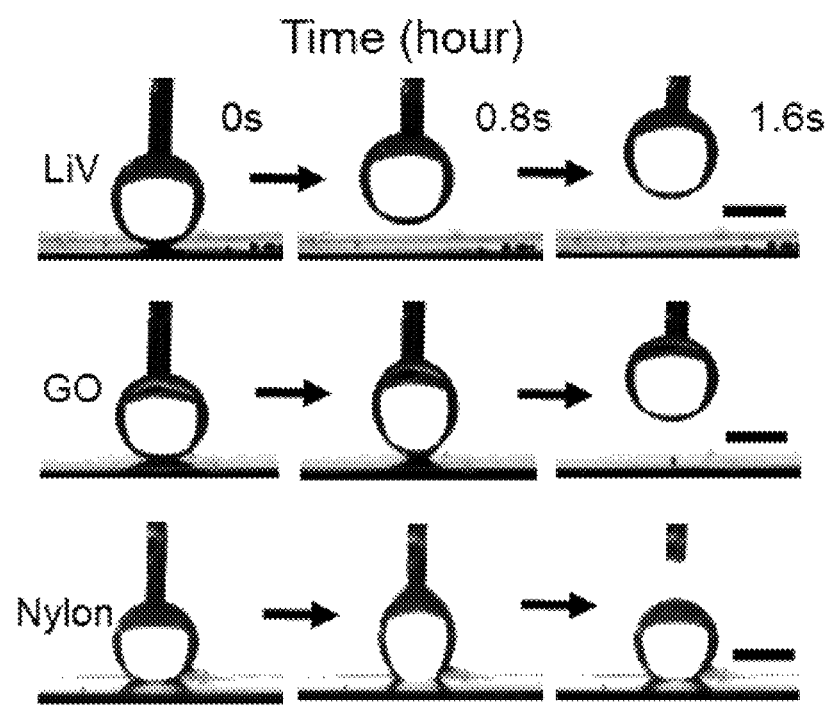
FIG. 5D shows photographs of the dynamic underwater oil-adhesion tests on bare Nylon, GO and LiV coated nylon. Scale bar; 600 µm. The arrows indicate the time sequence. Oil droplets were found to be easily lifted from the LiV coated nylon using a needle whereas its adhesion to bare nylon or GO coated nylon was high.
Figure 7:
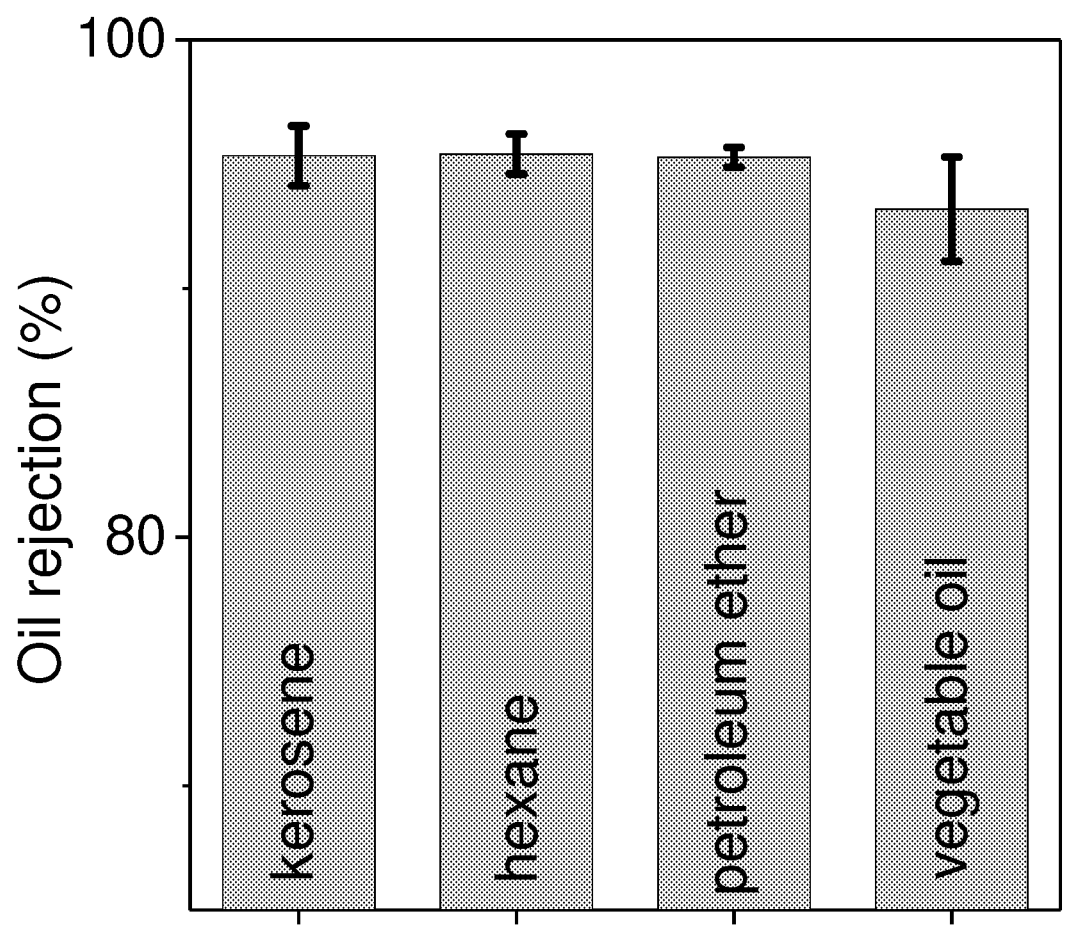
FIG. 7 shows the oil rejection of the LiV coated nylon membrane for different types of the emulsion prepared from different oils. Error bars denote standard deviations using three different samples.
Figure 9:
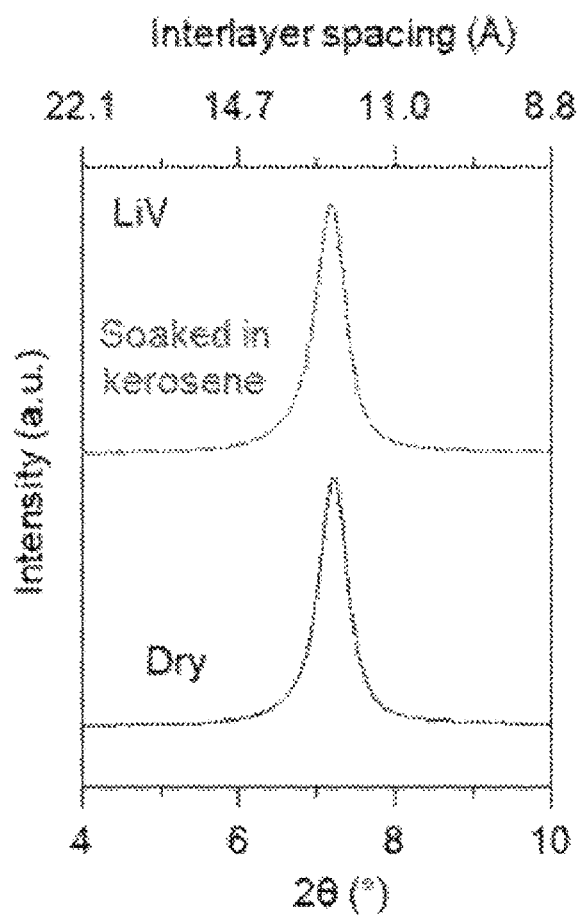
FIG. 9 shows the X-ray diffraction (XRD) spectra of the non-swelling Vermiculite laminate in oil. X-ray diffraction (XRD) from a vacuum dried free-standing LiV-laminate and the same membrane soaked in kerosene for 48 h (colour coded labels).

The observed antifouling properties of LiV coated membranes were found to be robust even for oil in water emulsion separations (FIG. 5C). Typically, during emulsion separations, oil droplets in the emulsion tends to adhere to the surface of the membrane and hence permanently foul the membranes after multiple filtration experiments. FIG. 5C shows that LiV coated membranes were completely recovered to their initial performance even after multiple cycles of filtration. Whereas the performance of the reference nylon membranes continuously deteriorated with increasing filtration cycle. LiV coated membranes also provided a high rejection (≈95%) of different types of oil (FIG. 7). Dynamic underwater oil-adhesion tests further show that the recovery of LiV coated membrane after multiple filtration is due to the weak adhesion of oil droplets to the surface of the LiV coated membranes (FIG. 5D). This can be further corroborated from the stable water flux obtained for the LiV coated PA membrane compared to a bare PA membrane in cross-flow filtration (Methods), where a tangential flow of the feed solution with even a smaller velocity of 0.05 m/s detach the oil droplet from the surface and decreases the fouling. The steady-state permeate flux through LiV coated PA membrane is found to be more than seven times higher than the bare PA and the flux increases with increasing cross-flow velocity (FIG. 9).

Figure 10A:
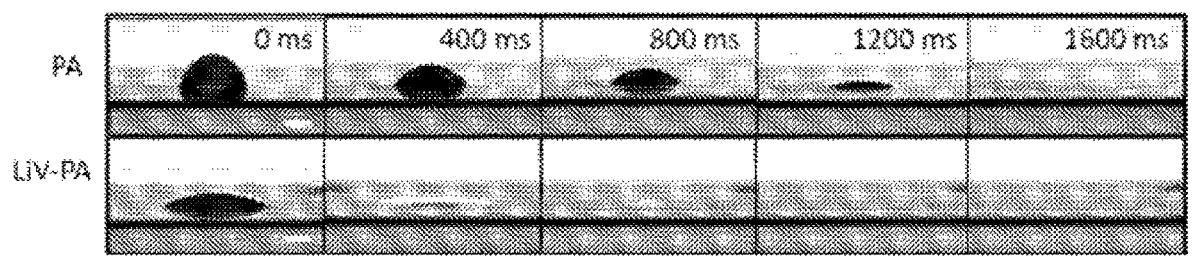
FIG. 10A shows the water wetting behaviour and water flux through LiV coated (30 nm) polyamide (PA) membrane evaluated by contact angle measurements in dynamic mode. Scale bars; 1000 µm.
Figure 10B:
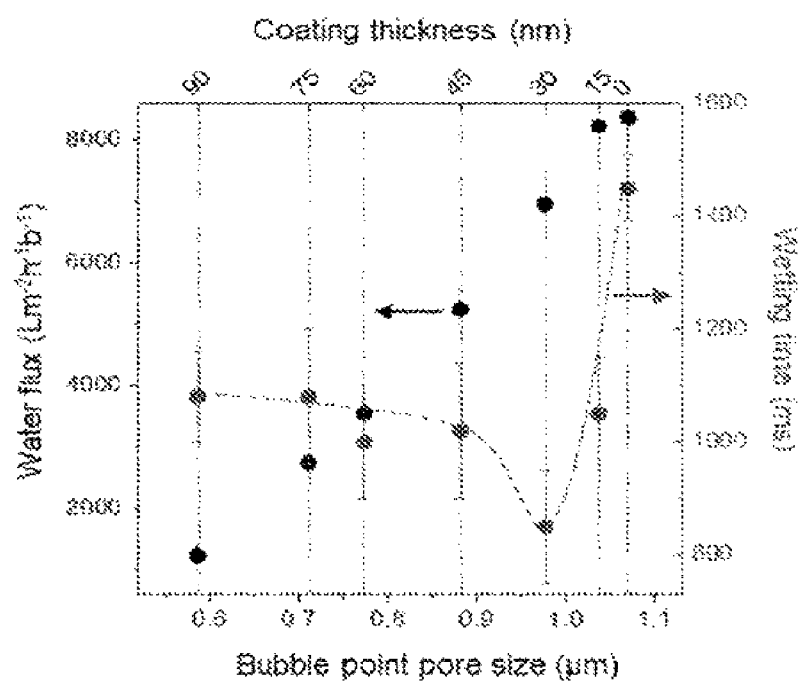
FIG. 10B shows water flux and water wetting time for LiV coated PA membranes with various coating thickness or pore size (colour coded axis). The dashed line is a guide to the eye. Error bars denote standard deviations using five different measurements. Water flux was measured by filtering 200 ml of water (after reaching into a steady state flux by filtering water for more than one hour) using a dead-end pressure filtration system at a pressure of 1 bar. The high-water flux and low wetting time of 30 nm LiV coated PA membranes makes them a suitable choice for antifouling studies.
Figure 11:
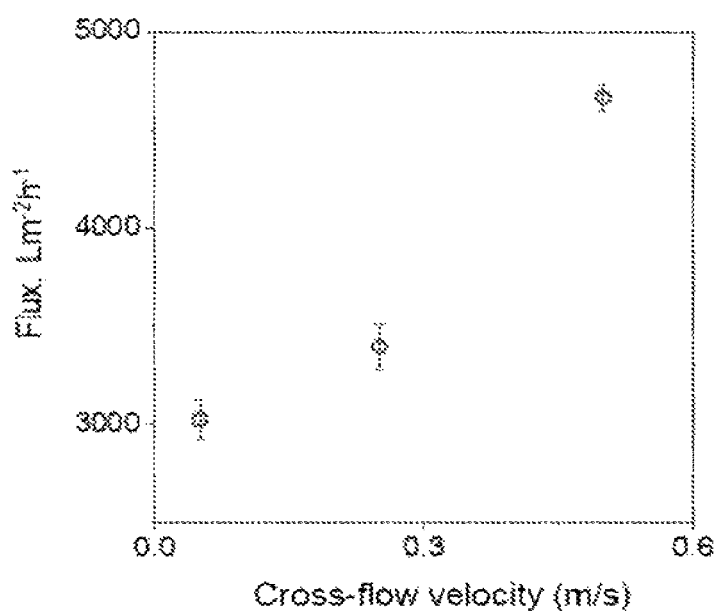
FIG. 11 shows cross-flow emulsion separation. Steady-state permeate flux of LiV coated PA membrane as a function of cross-flow velocity during the emulsion separation at 1 bar pressure.
Figure 12:
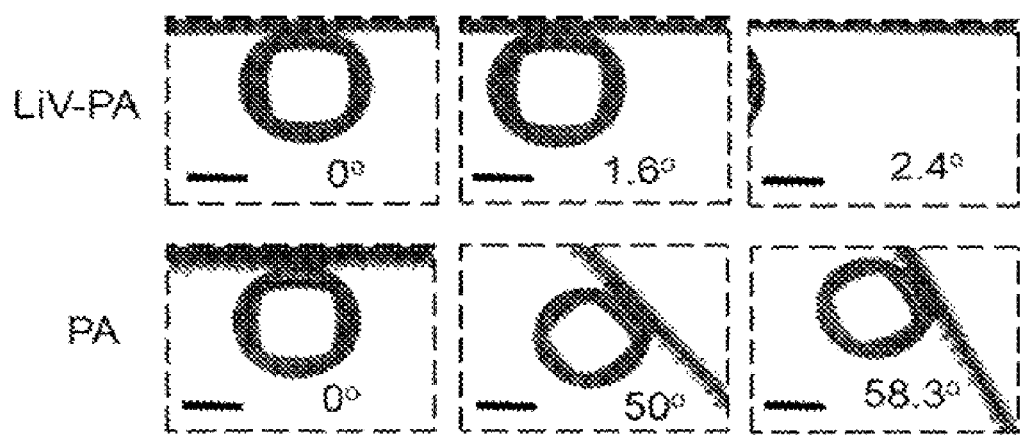
FIG. 12 shows oil droplet roll-off angle for a membrane of the invention. Photographs of an oil droplet (kerosene, 10 µL) on the surface of LiV coated polyamide (LiV-PA) and bare polyamide (PA) membrane at different tilt angles. Scale bars, 1 mm. For the LiV-PA membrane, at 1.6° the droplet starts to slide and completely rolls off at 2.4° whereas, for the bare PA, the droplet starts to slide at 50° and completely rolls at 58.3°. The negligibly small roll-off angle for LiV-PA surface implies a remarkably weaker adhesion force between the oil droplet and the membrane surface.
Figure 13:
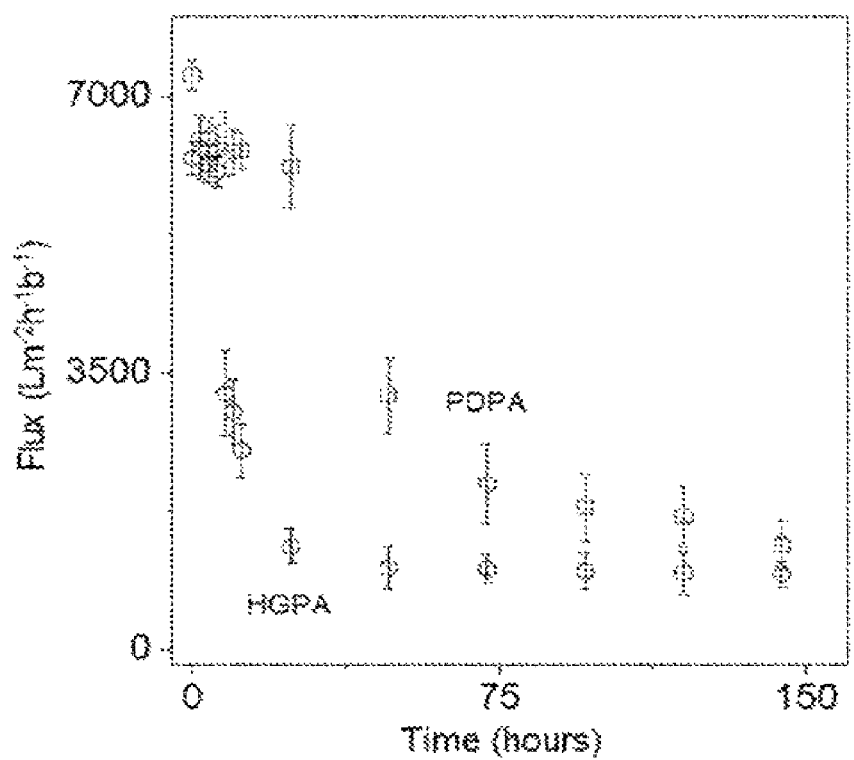
FIG. 13 shows fouling for a superhydrophilic polymer-coated PA. Water flux through polydopamine coated PA (PDPA) and polyacrylamide hydrogel coated PA (HGPA) as a function of time during which the membrane was in contact with the oil. The measurement of the flux is performed at 1 bar differential pressure. Error bars denote standard deviation using five different measurements.

To further demonstrate the significance of the LiV coating on the oil-water separation, we have compared the steady-state permeate flux and oil rejection of commercial microfiltration membranes polyethersulfone (PES), and polyvinylidene difluoride (PVDF) in cross-flow filtration before and after LiV coating. Compared to PA, both PES and PVDF were leaky to oil and LiV coating significantly enhances the oil rejection without hugely influencing the flux (FIG. 10, FIG. 10B and FIG. 7) even for less hydrophilic PVDF membranes. Additionally, we have investigated the effect of salt solution exposure on the wetting and antifouling properties of LiV coated membranes and this shows that the exposure to a salt solution of monovalent cations did not significantly affect the wetting or antifouling performance of the membranes (FIGS. 11 and 12).

The exceptionally stable antifouling properties of LiV coated membranes could be attributed to the LiV's super-hydrophilicity along with the water pinning properties. Superhydrophilic surface of the LiV improves the water wetting and oleophobic properties of nylon whereas water pinning due to the hydration of Li ions in LiV maintain the membrane in a hydrated state and hence a stable oil-repelling property for a long time. To confirm this further, we have also probed the wetting properties of LiV coated nylon membranes and found that LiV coating decreases the water wetting time and increases the underwater oleophobicity (FIGS. 6A, 6B, 8 and 13).

In summary, we have revealed LiV's super-hydrophilicity and stable hydration and we have demonstrated its unique opportunities in designing antifouling oil separation membranes.

Materials and Methods

Fabrication of Vermiculite Laminates

Vermiculite dispersion was obtained from the thermally expanded vermiculite (Sigma Aldrich, UK) via two-step ion exchange method as reported previously (G. F. Walker, W. G. Garrett, Chemical Exfoliation of Vermiculite and the Production of Colloidal Dispersions. *Science* 156, 385 (1967); J. J. Shao, K. Raidongia, A. R. Koltonow, J. Huang, Self-assembled two-dimensional nanofluidic proton channels with high thermal stability. *Nat Commun* 6, 7602 (2015)). 100 mg of vermiculite granules were added to 100 mL saturated NaCl (36 wt. %) solution and stirred under refluxing at 100° C. to replace the interlayer cations with Na. The solution was then filtered out, and the collected vermiculite flakes were repeatedly washed with water and ethanol to remove any residual salt. Sodium exchanged bulk vermiculite was then dispersed in 2M LiCl solution and refluxed for another 24 h followed by filtration and extensive wash with water and ethanol. Lithium vermiculite (LiV) flakes so-obtained were sonicated in water for 20 minutes in order to exfoliate into monolayer LiV flakes and subsequently centrifuged at 6000 rpm to remove any multilayers and bulk residues left in the solution. The thickness of the exfoliated vermiculite flakes (FIGS. 2A & 2B) was measured by using Veeco Dimension 3100 atomic force microscopy (AFM). Electron microscopy characterization of the flakes was carried out by using the Titan G2 80-200 STEM analytical scanning transmission electron microscope.

Figure 2A:
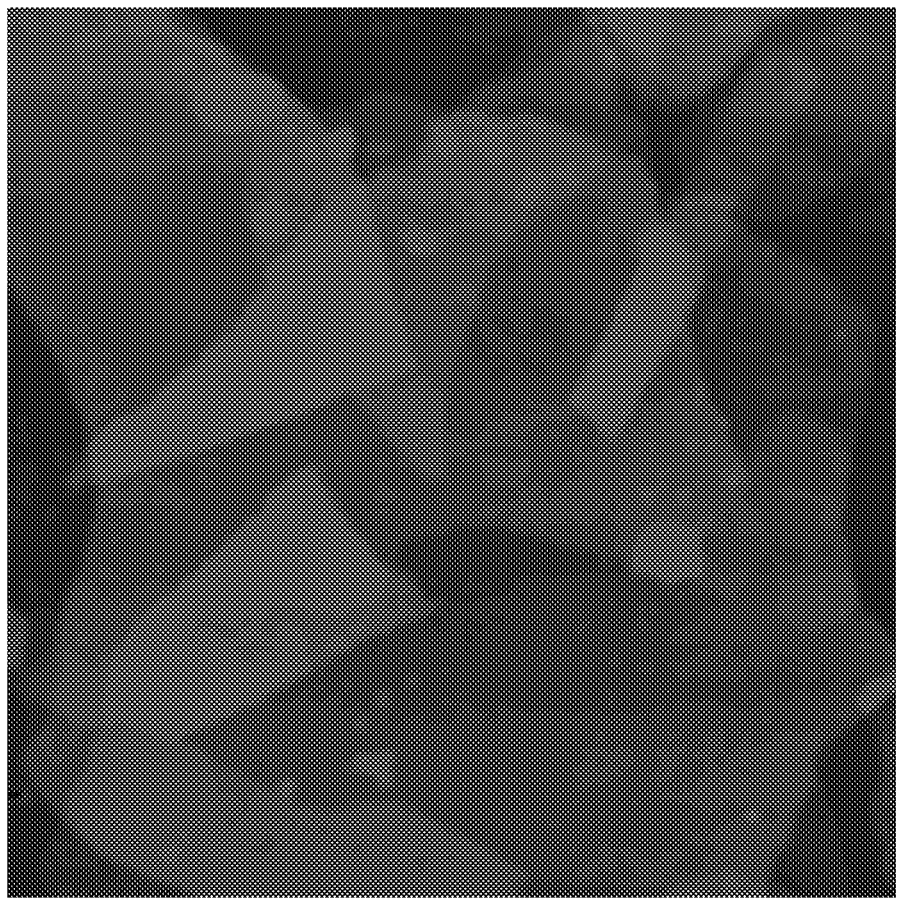
FIG. 2A shows an AFM image of vermiculite flakes drop-casted on a silicon wafer.
Figure 2B:
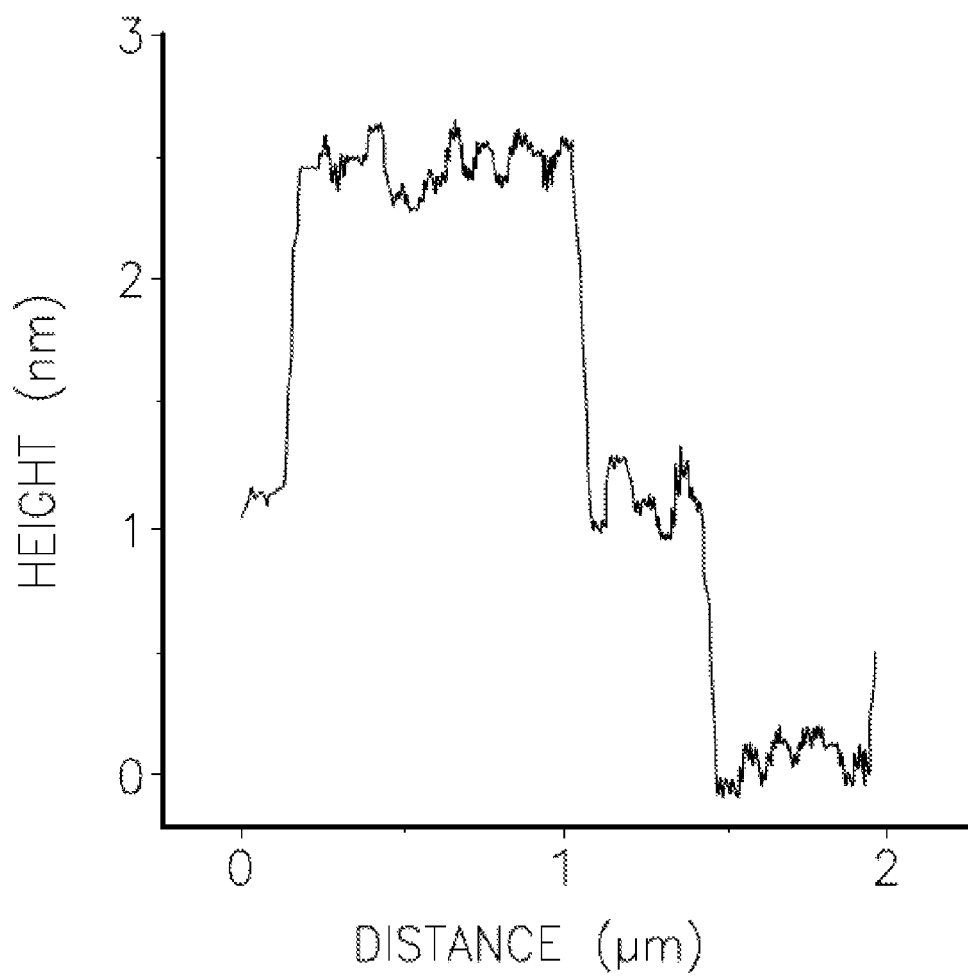
FIG. 2B shows a height profile graph of height (nm) versus distance (µm) for the vermiculite flakes drop-casted on a silicon wafer illustrated in FIG. 2A, and showing that the vermiculite flakes have an average thickness of 1.5 nm. Scale bar, 750 nm.

The LiV laminates of thickness≈5 µm were prepared by vacuum filtration of the LiV dispersion through a Whatman Anodisc alumina membrane filter (0.02 µm pore size and a diameter of 47 mm). The resulting vermiculite films on alumina filters were peeled off from the substrate to obtain free-standing LiV-laminates (FIG. 1).

Graphene oxide (GO) laminates used for the comparison were also prepared by vacuum filtration as reported previously by Abraham et al. In brief, the aqueous suspension of GO prepared by bath sonication of graphite oxide flakes (Bluestone Global Tech) were vacuum filtered through Anodisc alumina filters for obtaining free standing GO laminates.

Characterization of Vermiculite Laminates

We have used inductively coupled plasma atomic emission spectrometry (ICP-AES), and X-ray diffraction (XRD) to characterize the V-laminate. The samples for ICP-AES analysis were prepared by digesting the V-laminate in a mixture of 1 ml of 38% concentrated HCl and 1 ml of 70% concentrated $HNO_3$. The samples were heated at 70° C. on a hot block in the tubes before being made up to 10 ml with deionized water. The concentration of cations present in the V-laminate was evaluated in moles per mg of the dry V-laminate and is shown in Table 1 below. It should be noted that the $K^+$-ion is present in both the Li laminates and the starting bulk vermiculite. This is likely to be due to its strong binding to the vermiculite surface.

TABLE 1

ICP Analysis.
Concentration of cations in Li vermiculite laminates.

| Moles per mg | LiV | Bulk Vermiculite |
| --- | --- | --- |
| K | $2.7 \times 10^{-7}$ | $9.6 \times 10^{-7}$ |
| Li | $1.4 \times 10^{-6}$ | BDL |
| Ca | BDL | $3.5 \times 10^{-8}$ |
| La | BDL | BDL |
| Sn | BDL | BDL |

BDL denotes 'below detection limit'.

XRD experiments were performed to study the laminar structure and swelling properties of the free-standing V-laminate with 5 µm in thickness. We used Rigaku smart lab thin film XRD system (Cu-Kα radiation) operated at 1.8 kW. For acquiring XRD from dry V-laminate, initially, the samples were vacuum dried and stored in the glove box for 48 h. The dehydrated samples were sealed in air-tight X-ray sample holder inside the glove box and taken out for further XRD measurements. Then the same laminate were exposed to ambient air (40% RH) for 24 hours, and the measurements were repeated. For wet XRD, the laminates are soaked in the corresponding liquid for 48 hours and then immediately acquired the diffraction pattern.

Contact Angle Measurements

Sessile drop method (KRÜSS drop shape analyzer, DSA100S) was used to measure the water contact angle on the laminate. Free-standing laminate was placed on a holey flat stage such a way that the central part of the laminate would be on top of the hole. A micro-syringe needle was used to precisely control the drop volume (2 μl). The needle was lowered slowly until the drop touched the vermiculite laminates and then gently raised. The contact angle measurement module was operated in video mode at a capture speed of 60 frames per second.

Zeta Potential Measurements

We have measured the zeta potential of different V-laminates and its ionic strength dependence via the streaming potential technique (Anton Paar SurPASS3). These measurements were carried out by placing two V-laminates inside the measuring cell forming a capillary with 100 μm height. Then the test liquid (a mixture of LiCl and KCL) with known ionic strength was injected through the capillary at a specific pressure (200-600 mbar), and the potential difference was measured between the two ends of the streaming channel as the streaming potential.

For samples with a planar surface, its zeta potential can be related with the streaming potential by Helmholtz-Smoluchowski equation:

$$\xi = \frac{dU_{str}}{d\Delta p} \times \frac{\eta}{\varepsilon \times \varepsilon_o} \times \kappa$$

where $U_{str}$ is the measured streaming potential at a specific cross-capillary pressure $\Delta p$, $\kappa$ is the conductivity of the capillary, and $\eta$ and $\varepsilon \times \varepsilon_0$ are the viscosity and dielectric coefficient of the electrolyte solution.

LiV was found to have a zeta potential of −0.051V at 0.01M salt concentration, showing that the LiV flakes are negatively charged.

Vermiculite Coated Nylon Membranes

The vermiculite coated nylon membranes used for studying the antifouling oil-water/emulsion separation were prepared by filtering the vermiculite dispersion through a porous nylon support (170 μm thick EMD Millipore™ nylon hydrophilic membrane filters with 47 mm diameter) using a dead-end pressure filtration system (Sterlitech HP4750, 0.5 bar of overpressure), followed by overnight vacuum drying. The vermiculite coating thicknesses of 15, 30, 45, 60, 75, and 90 nm were fabricated. The coating thicknesses were estimated from the equation, $$t = \frac{C \times V}{A \times D} \quad (1)$$

where t is the thickness of the coating, C is the concentration of the vermiculite dispersion, V is the volume of the dispersion deposited, A is the coating area, and D is the density of vermiculite film. The density of the vermiculite film was obtained by measuring the weight and volume of a thick (~15 μm) freestanding V-laminate.

The bubble point pore size (largest pore size) of vermiculite coated nylon membranes was determined by using flow porometry technique (POROLUX™ 1000). The membranes were fully wetted with a low surface tension liquid (perfluoropolyether/porofil solution) and then sealed inside the sample chamber. Nitrogen gas was allowed to flow into the chamber so as to force the wetting liquid out of the membrane pores. The pressure at which $N_2$ gas overcomes the capillary pressure of the fluid and begins to flow through the wet sample yields the bubble point pore size, which is given by, $$D = \frac{4\gamma \cos\theta}{P} \approx \frac{4\gamma}{P} \quad (2)$$

where D is the membrane pore size/diameter, and γ is the surface tension of the wetting liquid, P is the pressure, and θ is the contact angle of the liquid.

Emulsion Separation Using LiV Coated Membrane

The feed oil-in-water emulsion was prepared by dissolving 100 mg of sodium dodecylbenzene sulfonate (SDBS) in 1 L of water followed by mixing with 1 g of kerosene/hexane/petroleum ether/vegetable oil. The mixture was sonicated and stirred for 1 hour to obtain a stable (stable for a week) milky emulsion. The emulsion was then poured into the pressure vessel fitted with the membrane, and the permeate mass was recorded every 30 seconds for a total of 30 minutes by a computer interfaced electronic scale (Ohaus, Navigator NV). After each 30 min, the membrane was soaked in deionized water to remove the adsorbed oil droplets from the surface of the membrane and repeated the emulsion separation. This process is carried out for five cycles, and the permeate flux is continuously monitored as shown in FIG. 5C. The membrane performance was characterized in terms of the initial permeate flux and total organic content in the permeate. LiV coated nylon, and the bare nylon membrane has an initial permeate flux of ~6500 $Lm^{-2}h^{-1}$, and it decreases by 90% in the first thirty minutes of the filtration process. However, the initial permeate flux got fully recovered for the LiV coated nylon membrane in the second and further cycles of filtration after a simple water soaking. The flux reduction and its recovery in each cycles of filtration could be attributed to the deposition of the oil droplets on the surface of the membrane and its removal by water soaking respectively. On the other hand, the initial permeate flux continuously declined for the bare nylon after each cycles of filtration and reduced to ~25% of the initial permeate flux after the fifth cycle (FIG. 5C).

The amount of oil permeated through the membrane is measured by using the total organic carbon (TOC) content analyser (Shimadzu TOC-VCPN analyser). The separation efficiency of the LiV coated membrane was calculated by oil rejection (R) given by $$R = \left(1 - \frac{C_p}{C_f}\right) \times 100 \quad (3)$$

where $C_p$ and $C_f$ are the total carbon content of the collected permeate and the feed emulsion, respectively. FIG. 7 shows the oil rejection for the LiV coated nylon membrane for different types emulsions prepared from different oils.

Wetting Properties of LiV Coated Nylon Membranes

Figure 6A:
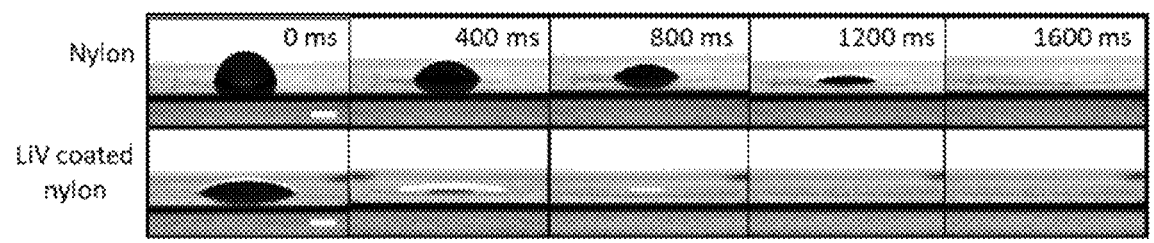
FIG. 6A shows water wetting behavior of the nylon and LiV coated (30 nm) nylon membranes evaluated by contact angle measurements in dynamic mode. Scale bars; 1000 µm.
Figure 6B:
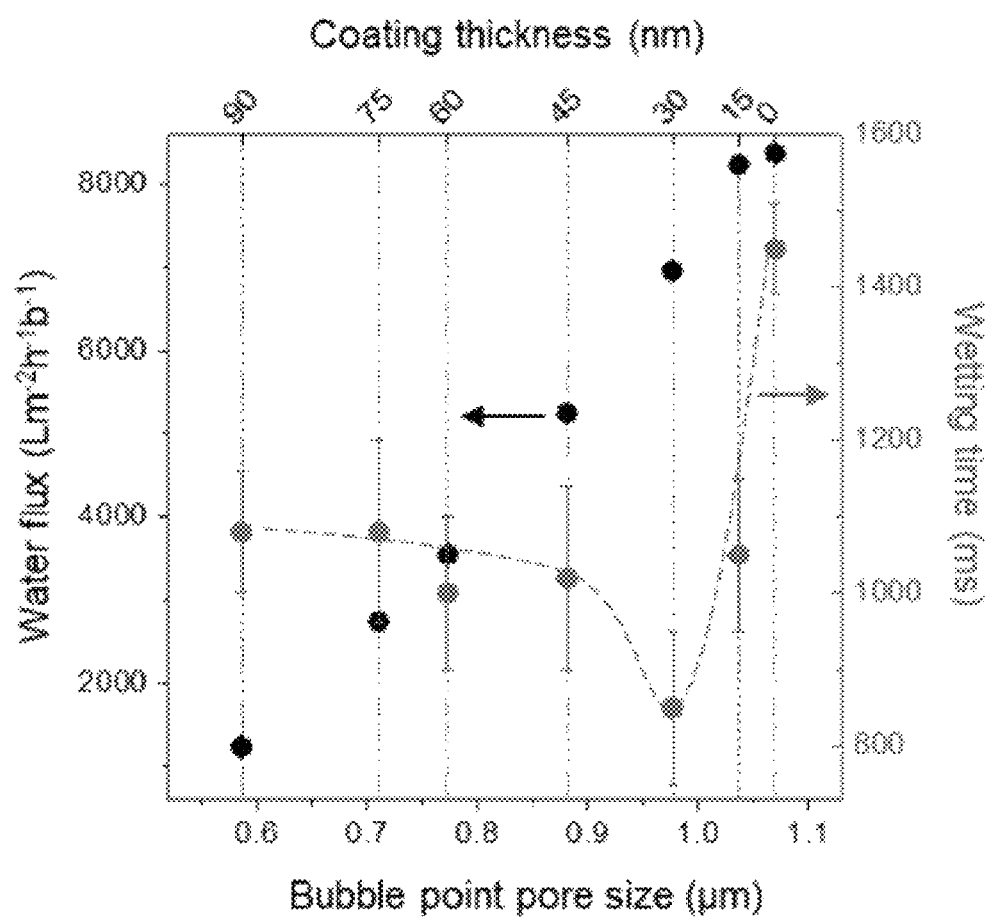
FIG. 6B shows water flux and water wetting time for LiV coated nylon membranes with various coating thickness or pore size. The dashed line is a guide to the eye. Error bars denote standard deviations using five different measurements. Water flux was measured by filtering 200 ml of water using a dead-end pressure filtration system at a pressure of 1 bar. The high-water flux and low wetting time of 30 nm LiV coated nylon membranes makes them useful as a choice for antifouling studies.

KRÜSS drop shape analyzer (DSA100S) was used to carry out all the wetting measurements. The wetting time of the LiV coated nylon membrane was studied by recording the time taken to fully spread 2 μL of water dropped on the surface of the membrane. For the precise measurement of wetting time, a high-resolution video camera was operated at a capture speed of 60 frames per second. For example, the wetting time for a 2 μL water droplet added to the LiV coated nylon membrane with a pore size of ~1 μm (coating thickness of ~30 nm) was found to be ~0.8 seconds whereas the droplet on bare nylon took ~1.4 seconds to get it spread completely (FIG. 6A). FIG. 6B shows the variation in wetting time as a function of LiV coating thickness or the pore size of the LiV coated membrane. It was found that ~30 nm is the optimum LiV coating thickness required for the shortest wetting time. The higher coating thickness leads to smaller pore size and lower surface roughness and hence longer wetting time.

Figure 8:
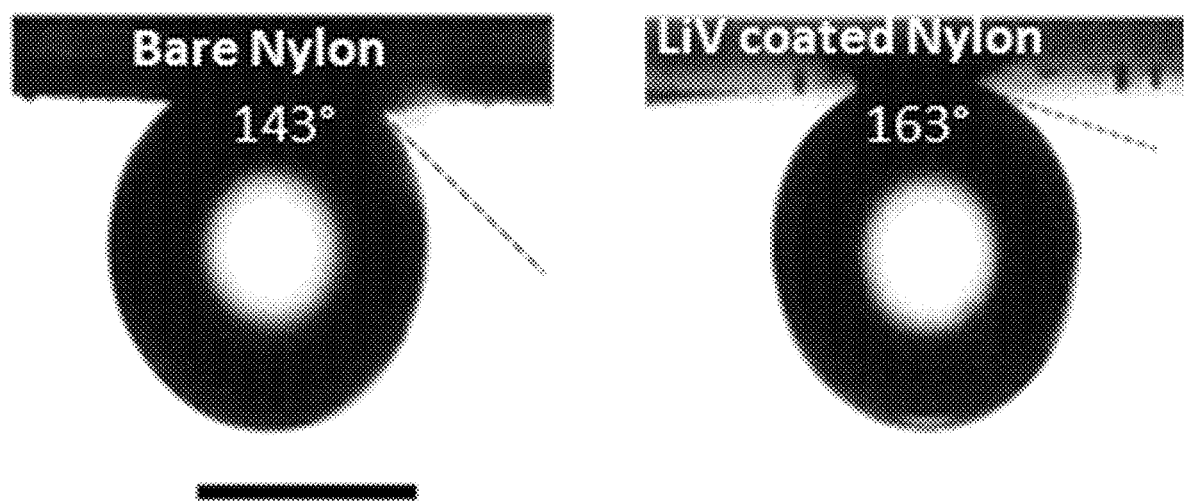
FIG. 8 shows the underwater oil contact angle measured on bare nylon and LiV coated (30 nm) nylon membrane. Scale bar; 600 µm.

The underwater contact angle measurements were also performed. A custom-made quartz cell was employed as the water reservoir, where the LiV coated membrane was fixed with coated-side-down on top of the container. The bottom of the cell was connected to a micro-syringe, where the oil droplets were released and floated to the surface of the membrane. The underwater oil contact angle of bare nylon was found to be 143°±3 whereas it increases to 164°±3° after coating with 30 nm LiV (FIG. 8)

For underwater oil adhesion test, an oil droplet (2 µl) was squeezed out from the micro-syringe to the surface of the sample immersed in water. The distance between the micro-syringe and the sample surface was optimized and fixed for all the measurement such that the oil droplet could be directly placed on the surface of the sample. Then the tip of the micro-syringe was moved away at a constant rate under the control of a lifting platform, and the shape change, and relative positions of the oil droplet were recorded every 400 ms with the aid of a high-resolution camera. FIG. 5D shows the position of oil droplet for bare nylon, reference GO coated nylon, and 30 nm LiV coated nylon as a function of time.

The invention claimed is:

1. A method of separating an oil and an aqueous medium from a mixture of the oil and the aqueous medium, the method comprising:
    A) contacting a first face of a composite membrane with the mixture of the oil and the aqueous medium to provide a separated aqueous medium at a second face of the composite membrane and a separated oil at the first face of the composite membrane; and
    B) recovering the separated aqueous medium from the second face of the composite membrane, or recovering the separated aqueous medium downstream from the second face of the composite membrane, and/or recovering the separated oil from the first face of the composite membrane, or recovering the separated oil downstream from the first face of the composite membrane,
    wherein:
    the composite membrane comprises a porous support membrane and a hydrated coating, wherein an external face of the hydrated coating corresponds to the first face of the composite membrane;
    the hydrated coating comprises a plurality of 2D phyllosilicate flakes and a plurality of cations associated with said 2D phyllosilicate flakes; and
    the hydrated coating is no less than 10 nm thick and no more than 60 nm thick.

2. The method of claim 1, wherein the 2D phyllosilicate flakes and the associated cations are selected such that, if the flakes and associated cations are formed into a hydrated 5 µm thick laminate membrane, the surface of the laminate membrane has a water contact angle that is less than 40° as measured using the Sessile drop method.

3. The method of claim 1, wherein the plurality of cations comprises ions having a single positive charge.

4. The method of claim 1, wherein the plurality of cations comprises metal ions.

5. The method of claim 1, wherein the plurality of cations comprises lithium ions.

6. The method of claim 1, wherein the 2D phyllosilicate flakes are 2D vermiculite flakes.

7. The method of claim 1, wherein the porous support membrane is a polymeric membrane.

8. The method of claim 1, wherein the porous support membrane has a water contact angle that is less than 90° as measured using the Sessile drop method.

9. The method of claim 1, wherein the mixture of the oil and the aqueous medium is an emulsion.

10. The method of claim 1, wherein the mixture of the oil and the aqueous medium is agitated as it is contacted with the composite membrane.

11. The method of claim 1, wherein contacting the first face of the composite membrane with the mixture of the oil and the aqueous medium comprises applying a force to the mixture as it is in contact with the first face of the composite membrane, said force being directed such as to cause the aqueous medium to pass through the composite membrane.

12. The method of claim 1, wherein contacting the first face of the composite membrane with the mixture of the oil and the aqueous medium comprises causing the mixture of the oil and the aqueous medium to flow across the first face of the composite membrane.

13. The method of claim 12, wherein the mixture flows across the first face of the composite membrane at a velocity between 0.05 ms$^{-1}$ and 5.0 ms$^{-1}$.

14. The method of claim 7, wherein the porous support membrane comprises nylon.

15. The method of claim 1, wherein the hydrated coating is no less than 10 nm thick and no more than 40 nm thick.

* * * * *